(12) United States Patent
Jen et al.

(10) Patent No.: US 8,381,144 B2
(45) Date of Patent: Feb. 19, 2013

(54) SYSTEM AND METHOD OF TEST MODE GATE OPERATION

(75) Inventors: Frederick C. Jen, Santa Clara, CA (US); Li Qiu, Santa Clara, CA (US); Hsiu C. Ma, Santa Clara, CA (US); Calvin V. Ho, Santa Clara, CA (US); Xiang M. Song, Santa Clara, CA (US); Hsiaohui Wu, Santa Clara, CA (US); Thomas E. Little, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 12/716,565

(22) Filed: Mar. 3, 2010

(65) Prior Publication Data

US 2011/0219277 A1 Sep. 8, 2011

(51) Int. Cl.
G06F 17/50 (2006.01)
G01R 31/28 (2006.01)

(52) U.S. Cl. ........ 716/106; 716/108; 716/110; 716/111; 716/113; 716/132; 716/136; 714/724; 714/726; 714/729

(58) Field of Classification Search .................. 716/106, 716/108, 111, 113, 132, 136; 714/724, 726, 714/729
See application file for complete search history.

(56) References Cited

U.S. PATENT DOCUMENTS

| | | | | |
|---|---|---|---|---|
| 3,576,541 A * | 4/1971 | Kwan et al. | ...................... | 714/32 |
| 4,588,944 A * | 5/1986 | Rothenberger | ............... | 714/731 |
| 4,771,251 A * | 9/1988 | Allen et al. | ...................... | 331/57 |
| 4,847,800 A * | 7/1989 | Daane | ........................... | 708/250 |
| 4,912,709 A * | 3/1990 | Teske et al. | .................... | 714/724 |
| 5,132,974 A * | 7/1992 | Rosales | .......................... | 714/731 |
| 5,801,958 A * | 9/1998 | Dangelo et al. | ............... | 716/102 |
| 5,903,466 A * | 5/1999 | Beausang et al. | ............. | 716/104 |
| 6,021,513 A * | 2/2000 | Beebe et al. | ................... | 714/726 |
| 6,377,512 B1 | 4/2002 | Hamamoto et al. | | |
| 6,461,882 B2 * | 10/2002 | Ishida et al. | .................... | 438/17 |
| 6,519,724 B1 * | 2/2003 | Arnould | ......................... | 714/712 |
| 6,539,536 B1 * | 3/2003 | Singh et al. | .................... | 716/102 |
| 6,615,391 B2 * | 9/2003 | Brown et al. | ................. | 716/136 |
| 6,615,392 B1 * | 9/2003 | Bernard et al. | ............... | 716/103 |

(Continued)

OTHER PUBLICATIONS

Bhunia S et al., "A novel low-power scan design technique using supply gating", Computer Design: VLSI in Computers and Processors, 2004, ICCD 2004, Proceedings. IEEE International Conference on San Jose, CA, USA Oct. 11-13, 2004, Piscataway, NJ, USA, IEEE, Oct. 11, 2004, pp. 6065, XP010736705, DOI: 10.1109/ICCD.2004. 1347900 ISBN: 978-0-7695-2231-9.

(Continued)

Primary Examiner — Helen Rossoshek
(74) Attorney, Agent, or Firm — Sam Talpalatsky; Nicholas J. Pauley; Jonathan T. Velasco

(57) ABSTRACT

A system and method to select a gate to be modified as a test isolation gate is disclosed. In a particular embodiment, a method includes, after a layout phase of generating a design of a circuit, receiving timing information related to the design of the circuit. The method also includes selectively identifying at least one gate of a combinational logic portion of the design of the circuit to be modified to respond to a test enable signal, the at least one gate identified at least partially based on the timing information. The method also includes modifying the at least one gate. The at least one modified gate is fixed at a constant level during a test mode and is dynamically changeable during a functional mode of operation of the circuit.

21 Claims, 7 Drawing Sheets

U.S. PATENT DOCUMENTS

| | | | |
|---|---|---|---|
| 6,718,523 B2* | 4/2004 | Hathaway et al. | 716/108 |
| 6,836,877 B1* | 12/2004 | Dupenloup | 716/103 |
| 7,069,486 B2* | 6/2006 | Nagamine et al. | 714/729 |
| 7,075,175 B2* | 7/2006 | Kazi et al. | 257/678 |
| 7,296,249 B2* | 11/2007 | Rinderknecht et al. | 716/106 |
| 7,348,796 B2 | 3/2008 | Crouch et al. | |
| 7,373,572 B2 | 5/2008 | Mak et al. | |
| 7,562,318 B2* | 7/2009 | Ang et al. | 716/136 |
| 7,707,021 B2* | 4/2010 | Cha et al. | 703/23 |
| 7,757,198 B1* | 7/2010 | Zhao et al. | 716/103 |
| 7,870,519 B2* | 1/2011 | Desineni et al. | 716/136 |
| 7,882,454 B2* | 2/2011 | Kusko et al. | 716/102 |
| 7,913,131 B2* | 3/2011 | McLaurin | 714/726 |
| 8,219,945 B2* | 7/2012 | Wang et al. | 716/103 |
| 2003/0088836 A1* | 5/2003 | Kanazawa et al. | 716/4 |
| 2003/0115555 A1* | 6/2003 | Wissel | 716/4 |
| 2007/0016834 A1* | 1/2007 | Debnath et al. | 714/726 |
| 2008/0201670 A1* | 8/2008 | Rinderknecht et al. | 716/4 |
| 2009/0115488 A1* | 5/2009 | Cortadella et al. | 327/365 |
| 2011/0145774 A1* | 6/2011 | Ross et al. | 716/112 |

OTHER PUBLICATIONS

Gerstendoerfer S et al., "Minimized Power Consumption for Scan-Based BIST", Proceedings International Test Conference, 1999, ITC99, Atlantic City, NJ, Sep. 28-30, 1999, [International Test Conference], New York, NY : IEEE, US, vol. CONF 30, Sep. 1, 1999, pp. 77-84, XP000928827, IDBN: 978-0-7803-5754-9.

International Search Report and Written Opinion—PCT/US2011/026861, ISA/EPO—May 4, 2011.

* cited by examiner

SYSTEM AND METHOD OF TEST MODE GATE OPERATION

I. FIELD

The present disclosure is generally related to selection and modification of a gate to hold an output logic level during a scan test.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

The computing capabilities of a computing device may be verified by testing components of an integrated circuit (IC) of the computing device. For example, components, such as flip-flops, may be coupled in a scan chain and may undergo a sequential scan test to determine errors within the IC. During a scan test, test data may be shifted sequentially into the scan chain to apply stimulus to the inputs of the scanable flip-flops. In a follow-up clock cycle, data from the scanable flip-flop inputs may be captured into their outputs. In a subsequent shifting operation the output data may be shifted out through the scan chain sequentially and compared with expected results to determine whether one or more faults have occurred in the IC.

Power dissipation during a scan test mode may be higher than in a non-test mode (e.g., a functional mode). The increased use of power during the scan test mode may result in a large voltage (IR) drop in the IC. The large IR drop could cause malfunction of the IC under test and may ultimately result in a yield reduction of the IC.

III. SUMMARY

A method of selecting a location of a test isolation gate within a combinational logic portion of a circuit is disclosed. The test isolation gate may reduce power dissipation during a test mode by preventing toggling of devices in a portion of the combinational logic portion, thus reducing power dissipation of the combinational logic portion during the test mode.

In a particular embodiment, the method includes, after a layout phase of generating a design of a circuit, receiving timing information related to the design of the circuit. The method also includes selectively identifying at least one gate of a combinational logic portion of the design of the circuit to be modified to respond to a test enable signal. The at least one gate is identified at least partially based on the timing information. The method also includes modifying the at least one gate, so that the at least one modified gate is fixed at a constant level during a test mode and is dynamically changeable during a functional mode of operation of the circuit.

In a particular embodiment, a circuit is disclosed that includes a combinational logic portion including a logic path including a test isolation gate between a starting element and an ending element. The logic path includes at least a first gate element between the starting element and the test isolation gate. The logic path also includes at least a second gate element between the test isolation gate and the ending element. The starting element and the ending element are coupled to be tested via a scan chain test process during a test mode. In the test mode, an output of the second gate element is fixed at a constant logic level.

One particular advantage provided by at least one of the disclosed embodiments is a test isolation gate of a circuit that lowers power dissipation of the circuit during a scan test mode.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
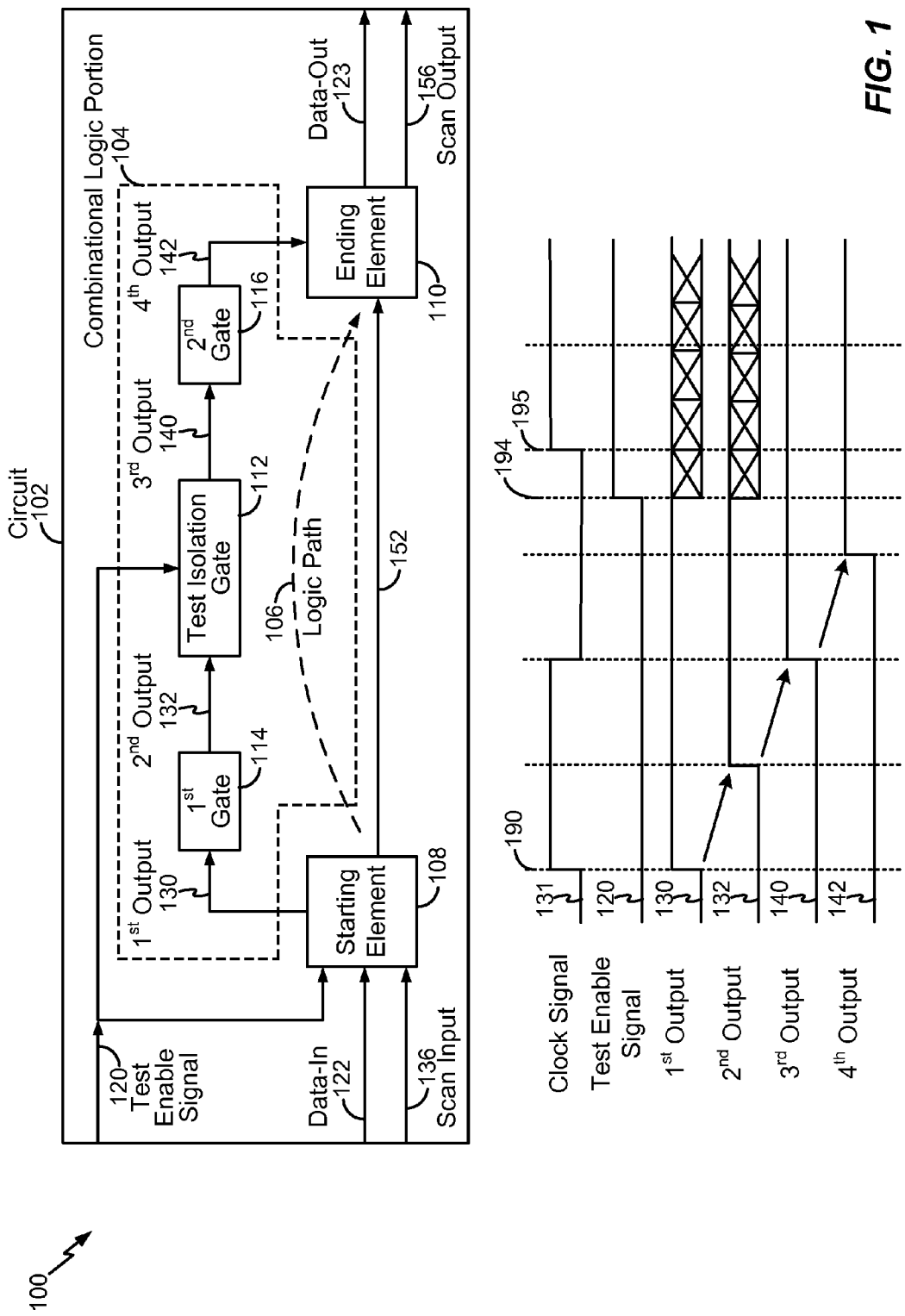
FIG. 1 is a diagram of a first illustrative embodiment of a system that includes a test isolation gate.

Referring to FIG. 1, a first illustrative embodiment of a system that includes a test isolation gate 112 is depicted and generally designated 100. The system 100 includes a starting element 108 coupled to an ending element 110 via a combinational logic portion 104. The combinational logic portion 104 includes a logic path 106 that couples the starting element 108 to the ending element 110. The logic path 106 includes a first gate 114, the test isolation gate 112, and a second gate 116. The test isolation gate 112 is responsive to a test enable signal 120 to fix an output of the test isolation gate 112 at a constant level during a test mode, resulting in reduced power consumption during a test mode of a circuit 102.

In a particular embodiment, the circuit 102 is configured to operate in either a functional mode or the test mode. During the functional mode, the circuit 102 may receive a data-in signal 122 and may generate a data-out signal 123. In the scan test mode (i.e., test mode), the starting element 108 may be configured to receive a scan input 136 and generate scan data 152. For example, the starting element 108 may be a scanable flip-flop or a scanable latch. The ending element 110 may be configured to receive the scan data 152 and in response, to generate scan output 156. In a particular embodiment, operation of the combinational logic portion 104, or portions thereof, is not necessary during scan testing and does not affect accuracy of data storage by the scan input signal 136, the scan data 152, and the scan output 156. As a result, the test isolation gate 112 may be configured to reduce power consumed by operation of the combination logic portion 104.

In a particular embodiment, the starting element 108 is configured to receive the data-in signal 122 and generate a first output 130. The first gate element 114 may be configured to receive the first output 130 and generate a second output 132 in response. For example, the first gate 114 may be a logical gate circuit element such as an AND gate, an OR gate, another logic gate, or any combination thereof. The test isolation gate 112 may be configured to receive the second output 132 and generate a third output 140. In response to receiving the third output 140, the second gate 116 may be configured to generate a fourth output 142 to be provided to the ending element 110. The ending element 110 may generate the data-out signal 123 in response to the fourth output 142. As a result, during the functional mode, the outputs 132, 140, and 142 of the first gate 114, the test isolation gate 112, and the second gate 116, respectively, may change (i.e., toggle) between a logical one and a logical zero or stay unchanged based on the data-in signal 122 of the circuit 102.

In a particular embodiment, the test isolation gate 112 is configured to operate in either the functional mode or the test mode based on the test enable signal 120. For example, in response to the test isolation gate 112 receiving a low value of the test enable signal 120 (i.e., a voltage corresponding to a logical zero value), the test isolation gate 112 may operate in the functional mode. In response to the test isolation gate 112 receiving a high value of the test enable signal 120 (i.e., a voltage corresponding to a logical one value), the test isolation gate 112 may operate in the test mode. During the functional mode, an output of the test isolation gate 112 may change. For example, when the test isolation gate 112 receives the low value of the test enable signal 120 during the functional mode, the third output 140 of the test isolation gate 112 may switch from a logic one to a logic zero based on a change in an input (e.g., the second output 132).

During the test mode, the test isolation gate 112 may be configured to act as an isolation element to prevent a signal from the first gate 114 from propagating to the second gate 116. For example, during the test mode, the third output 140 of the test isolation gate 112 may be held at a fixed level. For example, when the first test isolation gate 112 receives the high value of the test enable signal 120 to indicate the test mode, the third output 140 may not change in response to the test isolation gate 112 receiving the second output 132. In this case, the third output 140 of the test isolation gate 112 may remain at a fixed level despite a change in the second output 132. For example, the test isolation gate 112 may receive a change from a logical one to a logical zero at the second output 132, but the third output remains at the same level (e.g., a logical one or a logical zero). As a result, the second gate 116 does not receive a change in the third output 140 and thus does not change the fourth output 142. Preventing a change in a particular gate may reduce power dissipation in the logic path 106. For example, preventing the second gate 116 from toggling the fourth output 142 (i.e., from a logical zero to a logical one, or from a logical one to a logical zero) may reduce the amount of power consumed during the test mode of the circuit 102.

Because the test isolation gate 112 keeps succeeding gates (e.g., the second gate 116) in the logic path 106 from toggling during the test mode, a location of the test isolation gate 112 in the logic path 106 may control an amount of reduction of power dissipation during the test mode. For example, placing the test isolation gate 112 before the first gate 114 may prevent the first gate 114 from toggling the second output 132 in addition to preventing the second gate 116 from toggling. In this case, the test isolation gate 112 could reduce power dissipation in both the first gate 114 and the second gate 116. However, placement of the test isolation gate 112 before the first gate 114 may disrupt timing of the circuit 102.

During operation of the circuit 102, the outputs 140, 142 of the test isolation gate 112 and the second gate 116 may be fixed or may change based on whether the circuit 102 is in a functional mode or a test mode. For example, from time 190 to time 194, the circuit 102 is in a functional mode and from time 194, the circuit 102 is in a test mode. At the time 190, when the test enable signal 120 is a logical zero, in response to the input data 122, the first output 130 changes from a logical zero to a logical one. In response to detecting the change in the first output 130, the first gate 114 changes the second output 132 from a logical zero to a logical one. The test isolation gate 112 changes the third output 140 from a logical zero to a logical one in response to detecting a change at the second output 132. In response to detecting a change at the third output 140, the second gate 116 changes the fourth output 142 from a logical zero to a logical one. At the time 194, the test enable signal 120 changes from a logical zero to a logical one. In response to detecting the change in the test enable signal 120, the test isolation gate 112 prevents the third output 140 from changing after the time 194. For example, the test isolation gate 112 may detect a change in the second output 132 but may not change the third output 140. As a result of the third output 140 not changing, the second gate 116 may not change the fourth output 142.

In addition, in response to the test enable signal 120 being asserted, the starting element 108 may receive the scan in signal 136 and propagate the signal (e.g., the scan data 152) to the ending element 110. As a result, the starting element 108 and the ending element 110 may be configured as a scan chain. For example, the ending element 110 may receive the scan data 152 from the starting element 108, latch the scan data 152 in response to the clock signal 131, and provide the scan output 156 at a subsequent clock signal. The scan output 156 may be compared to values corresponding to the scan input 136 to detect one or more errors occurring within the scan chain for determining proper operation of the circuit 102.

By inserting the test isolation gate 112 between the first gate 114 and the second gate 116, the circuit 102 may consume less power during the scan test mode. Reducing power dissipation may prevent malfunction of the circuit 102 during the scan test mode, thus enabling higher yields of the circuit 102.

Figure 2:
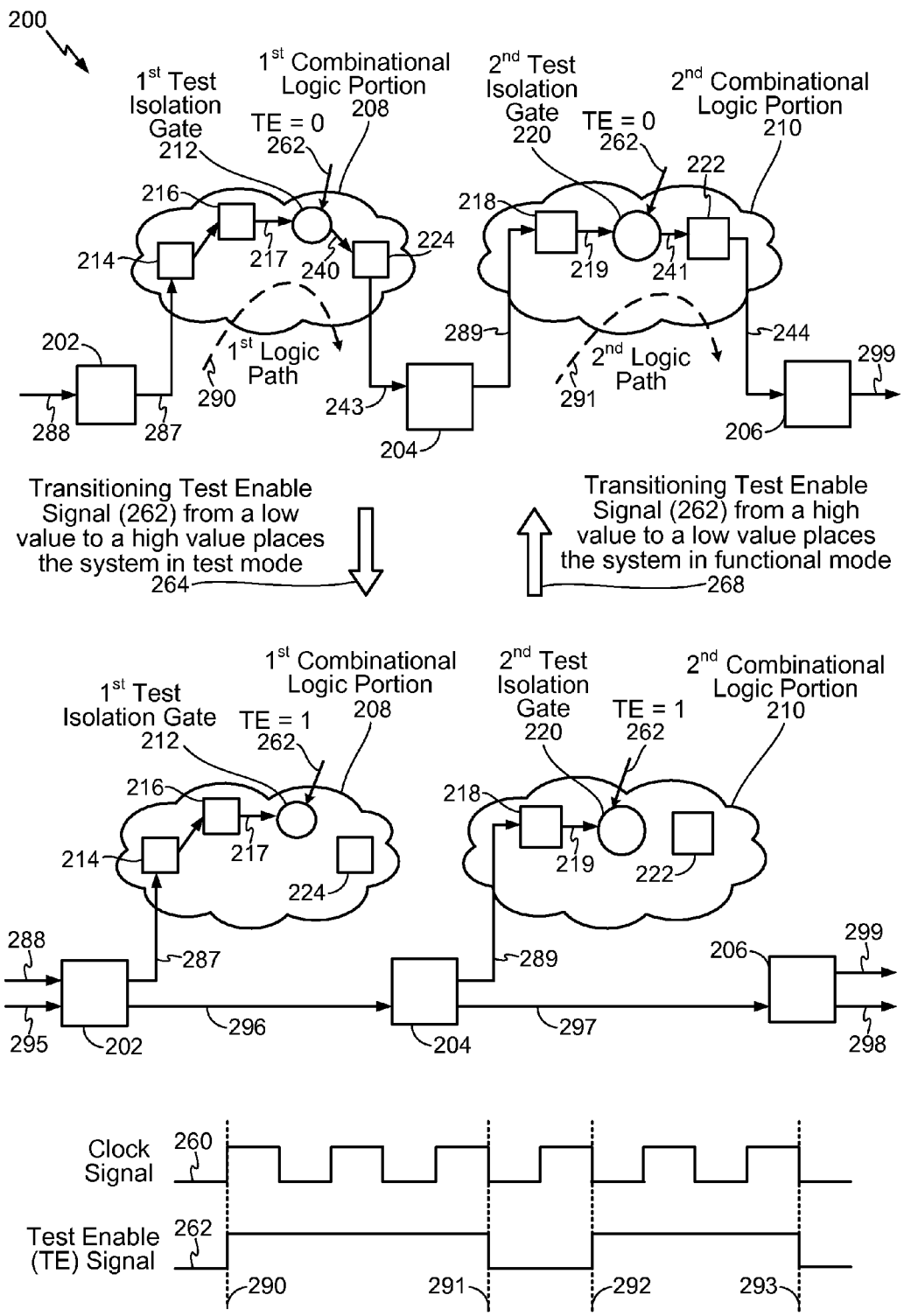
FIG. 2 is a diagram of a second illustrative embodiment of a system that includes a test isolation gate.

Referring to FIG. 2, a particular embodiment of a system that includes a test isolation gate is disclosed and generally designated 200. The system 200 includes a first scanable flip-flop 202, a second scanable flip-flop 204, and a third scanable flip-flop 206. The first scanable flip-flop 202 is coupled to the second scanable flip-flop 204 via a first combinational logic portion 208 and the second scanable flip-flop 204 is coupled to the third scanable flip-flop 206 via a second combinational logic portion 210.

In a particular embodiment, each combinational logic portion 208, 210 includes at least one logic path connecting a starting element to an ending element. For example, a first logic path 290 of the first combinational logic portion 208 couples the first scanable flip-flop 202 to the second scanable flip-flop 204. The first logic path 290 includes gates 214, 216, 224, and a first test isolation gate 212. As another example, a second logic path 291 of the second combinational logic portion 210 couples the second scanable flip-flop 204 to the third scanable flip-flop 206. The second logic path 291 includes gates 218, 222 and a second test isolation gate 220. In this case, the system 200 includes multiple combinational logic portions 208, 210 and multiple test isolation gates 212, 220.

In a particular embodiment, a test isolation gate (e.g., the first test isolation gate 212 or the second test isolation gate 220) is configured to operate in either a functional mode or a test mode based on a test enable signal 262, with timing illustrated with respect to a clock signal 260. For example, in response to a low value of the test enable signal 262, a test isolation gate may operate in the functional mode and in response to a high value of the test enable signal 262, the test isolation gate may operate in the test mode. During the functional mode, an output of the test isolation gate may change. For example, when the first test isolation gate 212 receives the low value of the test enable signal 262 during the functional mode, an output change 240 of the first test isolation gate 212 may be generated in response to an input change 217. In this case, the input change 217 and the output change 240 may represent a toggle between a logical one and a logical zero. The output change 240 of the first test isolation gate 212 may result in an output change 243 of the gate 224. As another example, when the second test isolation gate 220 receives the low value of the test enable signal 262 during the functional mode, an output change 241 of the second test isolation gate 220 may be generated in response to an input change 219. The output change 241 of the second test isolation gate 220 may result in an output change 244 of the gate 222.

In a particular embodiment, during the test mode, an output of a test isolation gate may remain at a fixed level (e.g., does not change from a logical one to a logical zero). FIG. 2 illustrates changes in output propagating through the system 200. For example, when the first test isolation gate 212 receives the high value of the test enable signal 262 during the test mode, the output change 240 generated in response to the input change 217 during the functional mode may not be generated. In this case, the output of the first test isolation gate 212 may remain at a fixed level despite the input change 217. As a result, the gate 224 may not receive an input change and therefore may not generate the output change 243.

As another example, when the second test isolation gate 220 receives the high value of the test enable signal 262 during the test mode, the output change 241 generated in response to input change 219 during the functional mode may not be generated. In this case, the output of the second test isolation gate 220 may remain at a fixed level despite the input change 219. As a result, the gate 222 may not receive an input change and therefore may not generate the output change 244. Preventing a change in a particular gate may reduce power dissipation in a logic path. For example, preventing the gate 224 and the gate 222 from generating the output change 243 and the output change 244, respectively, may reduce an amount of power dissipated during the test mode of the system 200.

If a test isolation gate keeps succeeding gates in a logic path from toggling, a location of the test isolation gate in the logic path may control the amount of reduction of power dissipation during the test mode. For example, the first logic path 290 includes two gates 214, 216 that are not controlled by the first test isolation gate 212 and the second logic path 291 includes one gate 218 that is not controlled by the second test isolation gate 220. In this case, the first logic path 290 will have more gates toggling and using power during the test mode than the second logic path 291.

During operation of the system 200 in the functional mode, the first scanable flip-flop 202 may receive an input change 288. The input change 288 may result in an output change 287 being transmitted to the first logic path 290. The second scanable flip-flop 204 may receive the output change 243 in response to the input change 287 and may generate an output change 289. The output change 289 may be transmitted to the second logic path 291 resulting in an output change 244 being received by the third scanable flip-flop 206. The third scanable flip-flop 206 may generate an output change 299 in response to the output change 244. The output change 299 may be transmitted to a fourth scanable flip-flop (not shown).

During operation of the system 200 in the test mode, the scanable flip-flops 202-206 may be coupled in a scan chain to be tested. In this case, the test mode corresponds to a scan test of at least one chain of sequential storage elements (i.e., the scanable flip-flops 202-206). For example, the first scanable flip-flop 202 may receive a scan input 295 and may generate a first scan output 296 that is transmitted to the second scanable flip-flop 204. In response to receiving the first scan output 296, the second scanable flip-flop may generate a second scan output 297. The third scanable flip-flop 206 may receive the second scan output 297 and may generate a third scan output 298. The third scan output 298 may be transmitted to a fourth scanable flip-flop (not shown) or alternatively to a testing device that determines whether the chain of scanable flip-flops 202, 204, 206 are operating properly.

In a particular embodiment, a test isolation gate changes between the functional mode and the test mode based on the test enable signal 262. For example, at time 290 and time 292 of the clock signal 260, the test enable signal 262 received by the test isolation gates 212, 220 changes from the low value to the high value. Transitioning the test enable signal 262 from the low value to the high value, illustrated by an arrow 264, may place the system 200 into the test mode. As another example, at time 291 and time 293 of the clock signal 260, the test enable signal 262 received by the test isolation gates 212, 220 changes from the high value to the low value. Transitioning the test enable signal 262 from the high value to the low value, illustrated by an arrow 268, may place the system 200 in the functional mode.

By inserting the test isolation gates 212, 220, the combinational logic portions 208, 210 may consume less power during the scan test mode. Reducing power dissipation may prevent malfunction of the system 200 during the scan test mode, thus enabling higher yields of the system 200.

Figure 3:
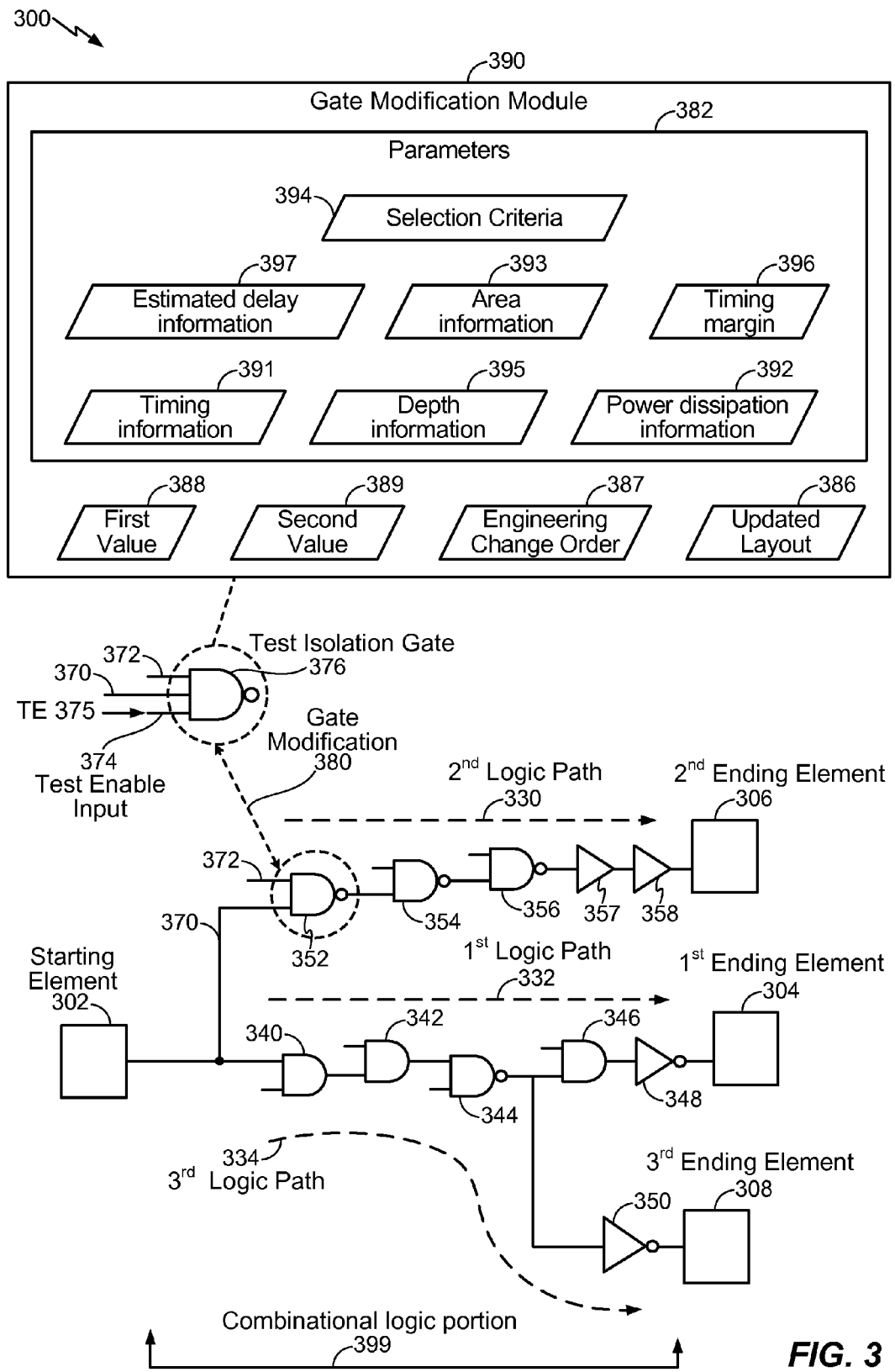
FIG. 3 is a diagram of a third illustrative embodiment of a system that includes a test isolation gate.

Referring to FIG. 3, a particular embodiment of a system that includes a test isolation gate 376 is disclosed and generally designated 300. The system 300 includes a starting element 302 coupled to a first ending element 304, a second ending element 306, and a third ending element 308 via logic paths of a combinational logic portion 399. The system 300 also includes a gate modification module 390 to identify and select a gate to be modified into a test isolation gate. The starting element 302 is coupled to the first ending element 304 by a first logic path 332 that includes gates 340-348. A second logic path 330 may couple the starting element 302 to the second ending element 306 via gates 352-358. Gates 340-344 and gate 350 may form a third logic path 334 that couples the starting element 302 to the third ending element 308.

In a particular embodiment, the gate modification module 390 is configured to receive parameters 382 related to operation of the combinational logic portion 399. The parameters 382 may include timing information 391, power dissipation information 392, area information 393, timing margin 396, estimated delay information 397, depth information 395, and selection criteria 394. For example, the gate modification module 390 may receive the parameters 382 from a testing unit (not shown) or the parameters 382 may be entered manually. Alternatively, or in addition, the gate modification module 390 may be configured to generate one or more of the parameters 382.

The timing information 391 may indicate an amount of time that is required for an operation of a gate of the combination logic portion 399. The power dissipation information 392 may indicate power dissipation of gate(s) of the combinational logic portion 399. The area information 393 may indicate the area of gate(s) of the combinational logic portion 399. The timing margin 396 may indicate an amount of timing slack available for delay due to modification of a particular gate. The estimated delay information 397 may indicate a delay that modifying a gate into a test isolation gate would introduce into the operation of the combinational logic portion 399. The depth information 395 may indicate a number of gates remaining in a logic path between a particular gate and an ending element. For example, the gate 352 may precede four gates in the second logic path 330 before the ending element 306. The selection criteria 394 may include rules that enable the gate modification module 390 to select a particular gate for modification based on the parameters 382. For example, if preventing a timing disruption of the combinational logic portion 399 is determined to be more important than reducing power dissipation, the selection criteria 394 may weigh consideration of the timing information 391 more heavily than the power dissipation information 392 in a rule of the selection criteria 394.

In a particular embodiment, the gate modification module 390 is configured to evaluate each logic path 330-334 to determine if one of the gates of a particular logic path may be replaced with a logically equivalent gate that also includes a test enable input for receiving a test enable signal. The gate modification module 390 may be configured to use the parameters 382 including the selection criteria 394 to evaluate gates within a logic path for potential modification into test isolation gates. For example, the gate 352 may be selected to be replaced with the test isolation gate 376. The gate 352 may be a NAND gate with two inputs 372, 370. Modification 380 of the gate 352 by the gate modification module 390 to form the test isolation gate 376 may include adding an additional input (e.g., test enable input 374) to generate a three-input NAND gate. A gate selected to be replaced with a test isolation gate may be any type of gate (e.g., AND, OR, NAND, NOR, or NOT gate) with one or more inputs. Modification of the selected gate may include replacing the selected gate with a test isolation gate that is the same or a different type of gate as the selected gate.

In a particular embodiment, the gate modification module 390 is configured to perform gate selection based on an estimated value of a design characteristic (e.g., first estimated value 388 and second estimated value 389). For example, the gate modification module 390 may generate the first estimated value 388 based on changes to the parameters 382 corresponding to a modification of a first gate and may generate the second estimated value 389 based on changes to the parameters 382 corresponding to a modification of a second gate. The gate modification module 390 may apply the selection criteria 394 to determine based on the first estimated value 388 and the second estimated value 389 if the first gate or the second gate should be modified into a test isolation gate.

In a particular embodiment, the gate modification module 390 is configured to select a location of a test isolation gate based on the timing information 391 related to an operation of a logic path. For example, the gate modification module 390 may determine that substituting the gate 340 with a test isolation gate may disrupt a timing of the first logic path 332. A disruption of the timing of the first logic path 332 may include data taking a different amount of time to propagate from the starting element 302 to the first ending element 304 via the first logic path 332 after replacement with a test isolation gate. In this case, the gate modification module 390 may not modify the gate 340. As another example, the gate modification module 390 may determine, based on the timing information 391, that substituting the gate 352 with the test isolation gate 376 may not disrupt the timing of the second logic path 330. In this case, modifying the gate 352 may result in data propagating from the starting element 302 to the second ending element 306 via the second logic path 330 in a time that enables the second logic path 330 to operate in an acceptable manner. A detailed description of a method of selecting and replacing a gate with a test isolation gate based on timing and depth information is described with respect to FIG. 4.

In a particular embodiment, the gate modification module 390 is configured to modify a design of a gate to generate a test isolation gate (e.g., the test isolation gate 376). Modifying the design may include changing an input of the gate to be modified, such as by adding the test enable input 374.

In a particular embodiment, the gate modification module 390 is configured to generate an updated layout 386 of the combinational logic portion 399 based on the gate modification 380. The gate modification module 390 may be configured to verify an operation of the updated layout 386. The updated layout 386 may be used to generate an engineering change order (ECO) 387.

In a particular embodiment, the test isolation gate 376 is configured to respond to a test enable signal 375. In response to the test enable signal 375, an output of the test isolation gate 376 may be fixed at a constant level during a test mode. For example, when the test enable signal 375 is the equivalent of a logical zero, the output of the test isolation gate 376 may not change logical levels regardless of the other two inputs 370, 372. A constant level output from the test isolation gate 376 may generate constant levels of input and output of the gates 354-358 in the second logic path 330. For example, the gates 354-358 may only change output levels in response to changes in input. In this case, the gates 354-358 may be prevented from toggling (e.g., change between a logical one and a logical zero) when the output of the test isolation gate 376 does not change.

The test isolation gate 376 may also be configured to be dynamically changeable during a functional mode of operation. For example, when the test enable signal 375 is the equivalent of a logical one, the output of the test isolation gate 376 may change logical levels based on the inputs 370, 372. In this case, during the functional mode, the test isolation gate 376 may perform an equivalent logical function as the gate 352.

By enabling both the functional mode and the test mode, the test isolation gate 376 may prevent or allow other gates (e.g., the gates 354-358) in the second logic path 330 to toggle (e.g., change between a logical one and a logical zero). Preventing the toggling of the gates 354-358 may reduce power dissipation of the system 300 during the test mode.

Figure 4:
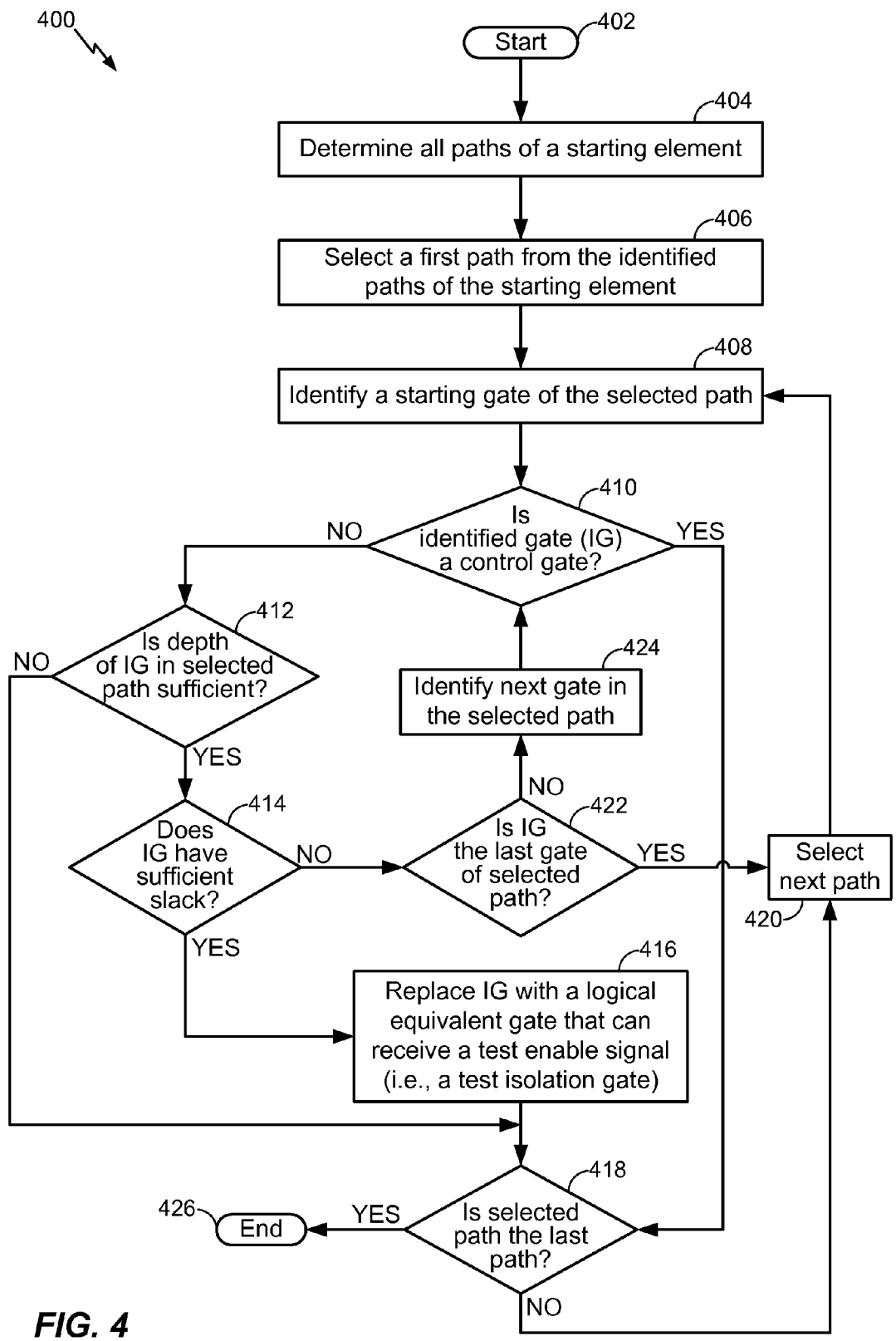
FIG. 4 is a flow chart of a first illustrative embodiment of a method of selecting a gate to be replaced with a test isolation gate.

Referring to FIG. 4, a flow chart of a first embodiment of a method to select and modify a gate of a circuit is illustrated and is generally designated 400. The method 400 commences at 402 and begins by determining all logic paths of a starting element, at 404. A logic path may include gates that couple the starting element to an ending element. For example, the starting element 302 of FIG. 3 may be coupled to the first ending element 304 by the first logic path 332 that includes the gates 340-348. The second logic path 330 may couple the starting element 302 to the second ending element 306 via the gates 352-358. The gates 340-344 and the gate 350 may form the third logic path 334 that couples the starting element 302 to the third ending element 308.

At 406, a first path from the identified paths of the starting element may be selected. For example, the first logic path 332 of FIG. 3 may be selected. At 408, a starting gate of the selected path may be identified. For example, the gate 340 may be identified as the starting gate of the first logic path 332. At 410, the identified gate may be analyzed to determine whether the identified gate is a test isolation gate. If the identified gate is not a test isolation gate, then processing may proceed at 412. For example, the gate 340 may be determined to not be a test isolation gate.

The identified gate may be analyzed to determine whether the depth of the identified gate within the selected logic path is sufficient for replacement of the identified gate with a test isolation gate, at 412. If the depth of the identified gate is sufficient for replacement, processing may proceed to 414. For example, if the gate 340 of FIG. 3 were modified to receive the test enable signal 375 as a test isolation gate, then all of the gates 342-348 in the first logic path 332 would be held at a constant level during a test mode, thus reducing power dissipation. In this case, an analysis of the gate 340 may indicate that the depth of the gate 340 in the first logic path 332 is sufficient for replacement with a test enable input.

At 414, a determination may be made whether timing information corresponding to the identified gate indicates that sufficient slack in timing enables the identified gate to be replaced or modified to receive a test enable signal. If sufficient timing slack does not exist, processing proceeds to 422. For example, the gate 340 of FIG. 3 may be determined to not have sufficient timing slack to be replaced.

At 422, a determination may be made whether the identified gate is the last gate of the selected path. If the identified gate is not the last gate of the selected path, processing may proceed to 424. For example, the gate 340 of FIG. 3 is not the last gate of the first logic path 332. At 424, the next gate succeeding the identified gate is identified. For example, the gate 342 of FIG. 3 may be identified as the next gate succeeding gate 340. After advancing to the next gate in the selected path, the identified gate may be analyzed, at 410. For example, an analysis of gates 342-346 at 410, 412, and 414 may have similar results indicating that the gates 342-346 have sufficient depth in the first logic path 332 to be modified to receive the test enable signal but the timing information may indicate that sufficient slack does not exist for replacement of any of the gates without disrupting the timing of the first ending element 304.

Returning to 412, if the depth of the identified gate is determined to lack sufficient depth to be modified to receive the test enable signal, processing may proceed to 418. For example, the gate 348 of FIG. 3 may be determined to be too far into the first logic path 332 (i.e., too close to the first ending element 304) to warrant replacement. In this case, modifying the gate 348 to receive the test enable signal would prevent the toggling of only one gate (i.e., the gate 348) in the first logic path 332; thus, the replacement may reduce power dissipation by a small amount. In a particular embodiment, the benefit of the reduction in power dissipation due to replacement of the gate 348 may not significantly exceed the cost of changing the physical layout of a circuit that includes the gate 348. In this case, the gate 348 may not be modified.

At 418, a determination of whether the selected path is the last path of the starting element is made. If the selected path is not the last path of the starting element, then processing proceeds to 420. For example, the first path 332 of FIG. 3 may not be the last path of the starting element 302. In this case, the second logic path 330 and the third logic path 334 may be additional paths that have not been analyzed.

At 420, the next path is selected. For example, the next path after the first logic path 332 may be the second logic path 330. After advancing to the next path, processing may return to 408. For example, at 408, the gate 352 may be identified as the starting gate of the second logic path 330, and at 410, the gate 352 may be determined to not be a test isolation gate. Alternatively, at 410, if the identified gate is determined to be a test isolation gate then processing may proceed to 418. For example, FIG. 3 shows the modification 380 of the gate 352 to the test isolation gate 376. In this case, if the test isolation gate 376 is analyzed at 410, the method may determine that the test isolation gate 376 is a suitable test isolation gate.

Returning to 414, if the identified gate is determined to have sufficient slack to enable modification of the identified gate to receive the test enable signal, processing may proceed to 416. For example, an analysis of the gate 352 of FIG. 3 may determine that sufficient timing slack exists for the gate 352 to be replaced with the test isolation gate 376 that receives the test enable signal via the test enable input 374.

At 416, the identified gate is replaced with a logically equivalent gate that can receive the test enable signal. For example, the gate 352 of FIG. 3 may be replaced with the test isolation gate 376. After modifying the identified gate in the selected path, processing proceeds to 418.

At 418, a determination is made whether the selected path is the last path of the starting element. If the selected path is not the last path, processing proceeds to 420. For example, the third logic path 334 of FIG. 3 may not have been analyzed. The third path 334 includes gates 340-344 of the first path 332 and therefore blocks 410, 412, 414 may generate similar results as the analysis of the first logic path 332 that indicated that the gates 340-344 lack sufficient timing slack to be replaced with a test isolation gate. At 424, the gate 350 of the third logic path 334 may be identified as the next gate in the selected path.

At 410, a determination may indicate that the gate 350 is not a test isolation gate. The gate 350 may be determined to lack sufficient depth to be replaced, at 412. In this case, processing may proceed to 418 where a determination may be made that the selected path is the last path of the starting element, and processing may end, at 426.

By replacing a gate in a logic path of a combinational logic portion (e.g., the combinational logic portion 399 of FIG. 3) with a test isolation gate, the combinational logic portion may consume less power during the scan test mode. By selecting a location of the test isolation gate within the logic path based on timing information (e.g., the timing information 391) and depth information (e.g., the depth information 395) corresponding to the operation of the logic path, the combinational logic portion may reduce power consumption during the scan test mode without disrupting the timing of data (e.g., the delivery of data from the starting element to an ending element) during the functional mode. Reducing power dissipation may prevent malfunction of the combinational logic portion 399 during the scan test mode.

Figure 5:
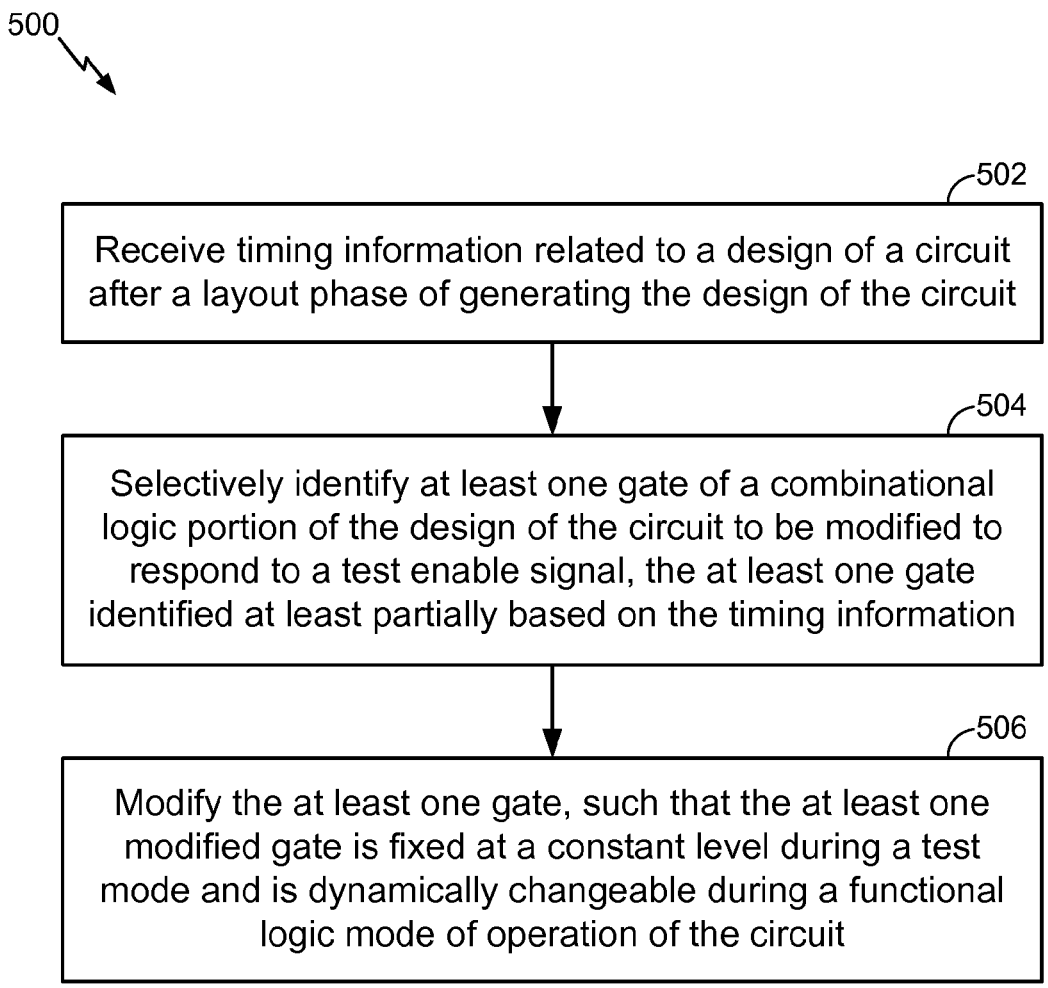
FIG. 5 is flow chart of a second illustrative embodiment of a method of selecting a gate to be replaced with a test isolation gate.

Referring to FIG. 5, a flow chart of a second embodiment of a method to select and modify a gate of a circuit is illustrated and generally designated 500. The method 500 includes receiving timing information related to the design of the circuit after a layout phase of generating the design of a circuit, at 502. For example, the gate modification module 390 of FIG. 3 may receive the timing information 391 related to the design of a circuit.

The method 500 also includes selectively identifying at least one gate of a combinational logic portion of the design of the circuit to be modified to respond to a test enable signal where the at least one gate is identified at least partially based on the timing information, at 504. For example, the gate modification module 390 of FIG. 3 may selectively identify the gate 352 based on the timing information 391.

The at least one gate may be selected to be modified based on various characteristics, such as power dissipation, logic path timing, and an area of the combinational logic portion. For example, the gate modification module 390 of FIG. 3 may select a gate based on power dissipation information 392, timing information 391, and area information 393 of the combinational logic portion 399. The method 500 may include determining a depth level of the at least one gate and selectively identifying the at least one gate based on the depth level. For example, the gate modification module 390 of FIG. 3 may identify the gate 352 based on the depth information 395.

A starting element of a logic path within the combinational logic portion may be determined. For example, the gate modification module 390 of FIG. 3 may determine the starting element 302 as the starting element of the second logic path 330 within the combinational logic portion 399. The method 500 may include traversing the logic path from the starting element to an end element of the logic path to locate one or more gates along the logic path. For example, the gate modification module 390 may traverse the second logic path 330 from the starting element 302 to the ending element 306. The method 500 may include applying selection criteria to the one or more located gates to selectively identify the at least one gate to be modified. For example, the gate modification module 390 may apply selection criteria 394 to the gates 352-358 of the second logic path 330 to identify the gate 352 to be modified.

A set of elements of the combinational logic portion may be determined. For example, the gate modification module 390 of FIG. 3 may determine the starting element 302, the first ending element 304, the second ending element 306, and the third ending element 308 of the combinational logic portion 399. The method 500 may include determining, for each particular element of the set of elements, one or more logic paths coupled to an output of the particular element. For example, the gate modification module 390 of FIG. 3 may determine that the first logic path 332, the second logic path 330, and the third logic path 334 are coupled to the starting element 302.

The method 500 may include determining, for each particular element, whether an estimated delay associated with a modified operation of the particular element satisfies a timing margin for each of the one or more logic paths. For example, the gate modification module 390 of FIG. 3 may determine whether the estimated delay information 397 satisfies the timing margin 396. The particular element is selectively identified at least partially based on the modified operation satisfying the timing margin and at least partially based on a location of the particular element. For example, the gate modification module 390 of FIG. 3 may identify the gate 352 based on satisfaction of the timing margin 396 and the location of the gate 352.

The method 500 also includes modifying the at least one gate, where the at least one modified gate is fixed at a constant level during a test mode and is dynamically changeable during a functional mode of operation of the circuit, at 506. For example, the gate modification module 390 of FIG. 3 modifies 380 the gate 352 to the test isolation gate 376. The test mode may correspond to a scan test of at least one chain of sequential storage elements. The at least one chain of sequential storage elements may include a scan chain of flip-flops. For example, the starting element 108 and the ending element 110 of FIG. 1 may be a scan chain of flip-flops.

The at least one modified gate may be configured to hold a particular state while a test enable signal is asserted. For example, the test isolation gate 376 of FIG. 3 is configured to hold a particular state when the test enable signal 375 is asserted. The at least one modified gate may be configured to output a signal in response to the asserted test enable signal to maintain a state of logic elements that are responsive to the modified gate along a logic path. For example, the test isolation gate 112 of FIG. 1 is configured to output the third output 140 that maintains the second gate 116 along the logic path 106.

Fixing the at least one modified gate at the constant level may include holding a logical output value of the at least one modified gate in response to the test enable signal being asserted. For example, the test isolation gate 112 of FIG. 1 may hold the third output 140 at a constant level in response to the test enable signal 120 being asserted.

The at least one gate may be modified by changing an input of the at least one gate. Changing the input of the at least one gate may include adding an input coupled to receive a test enable signal. For example, the gate modification module 390 of FIG. 3 may modify the gate 352 by adding the test enable input 374. The method 500 may also include at least partially re-routing the combinational logic portion based on the at least one modified gate. For example, modifying the gate 352 of FIG. 3 to form the test isolation gate 376 may increase a size of the gate 352. In response to the increase in the size, the gate modification module 390 may move gates around in a design layout.

The design of the circuit may also include a second combinational logic portion and a second gate of the second combinational logic portion of the design of the circuit may be selectively identified to be modified to respond to the test enable signal. For example, the gate modification module 390 of FIG. 3 may identify and modify a gate to form the test isolation gate 220 of the second combinational logic portion 210 of FIG. 2.

An operation of the combinational logic portion including the at least one modified gate may be verified. For example, the gate modification module 390 of FIG. 3 may verify the operation of the combination logic portion 399 after the modification 380 of the test isolation gate 376. Engineering change order (ECO) data may be generated corresponding to the at least one modified gate. For example, the gate modification module 390 may generate the ECO 387. A layout of the circuit may be updated based on the ECO data. For example, the gate modification module 390 of FIG. 3 may update the layout (e.g., the updated layout 386) based on the ECO 387. The method 500 may include verifying timing of operation of the combinational logic portion after modifying the least one gate.

Figure 6:
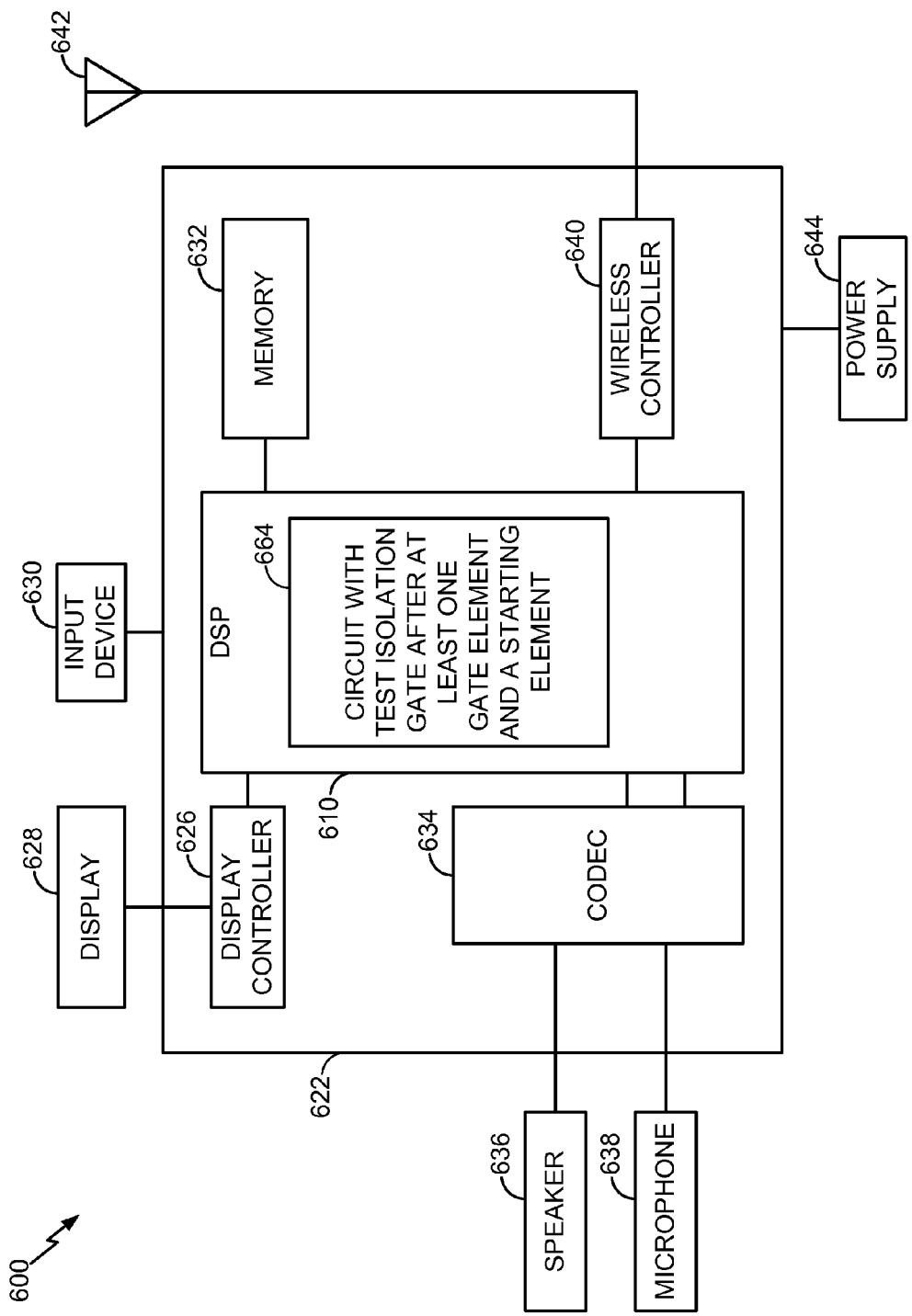
FIG. 6 is a block diagram of a particular embodiment of a wireless communication device that includes a test isolation gate.

FIG. 6 is a block diagram of an embodiment of a wireless communication device 600 having a circuit 664 with a test isolation gate. The test isolation gate is located within a logic path of the circuit 664 after at least one gate and a starting element. The wireless communication device 600 may be implemented as a portable wireless electronic device that includes a processor 610, such as a digital signal processor (DSP), coupled to a memory 632.

In an illustrative example, the circuit 664 with the test isolation gate coupled to a logic path after at least one gate and a starting element includes one or more of the components, circuits, or systems of FIGS. 1-3, is designed in accordance with FIGS. 4-5, or any combination thereof. The circuit 664 may be at the DSP 610 or may be a separate device. Although the circuit 664 is illustrated as integrated with the DSP 610, in other embodiments the circuit 664 may be external to the DSP 610.

In a particular embodiment, a display controller 626 is coupled to the processor 610 and to a display device 628. A coder/decoder (CODEC) 634 can also be coupled to the processor 610. A speaker 636 and a microphone 638 can be coupled to the CODEC 634. A wireless controller 640 can be coupled to the processor 610 and to a wireless antenna 642.

In a particular embodiment, the signal processor 610, the display controller 626, the memory 632, the CODEC 634, and the wireless controller 640 are included in a system-in-package or system-on-chip device 622. In a particular embodiment, an input device 630 and a power supply 644 are coupled to the system-on-chip device 622. Moreover, in a particular embodiment, as illustrated in FIG. 6, the display device 628, the input device 630, the speaker 636, the microphone 638, the wireless antenna 642, and the power supply 644 are external to the system-on-chip device 622. However, each of the display device 628, the input device 630, the speaker 636, the microphone 638, the wireless antenna 642, and the power supply 644 can be coupled to a component of the system-on-chip device 622, such as an interface or a controller.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above.

Figure 7:
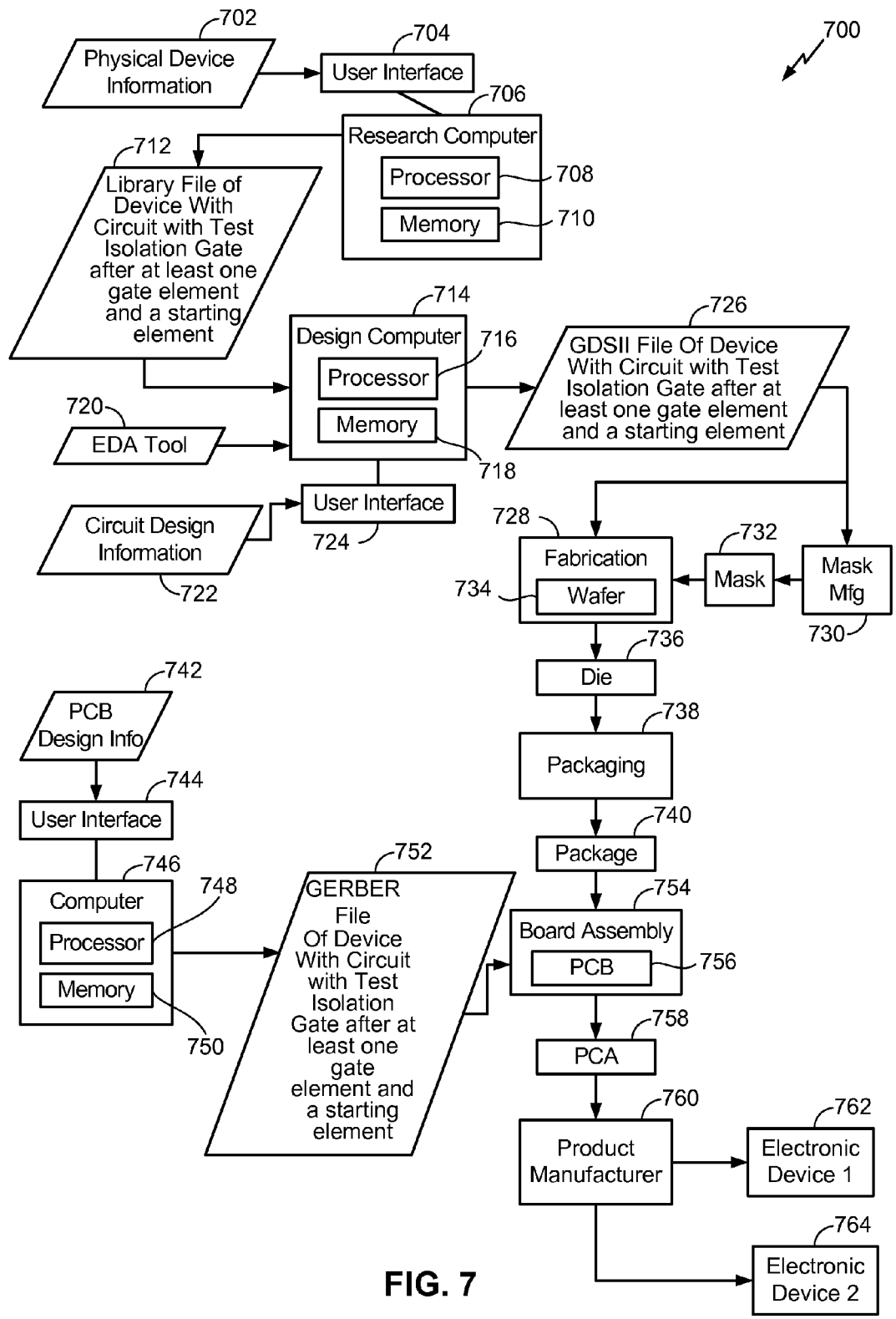
FIG. 7 is a data flow diagram illustrating a manufacturing process for use with a device that includes a test isolation gate.

FIG. 7 depicts a particular illustrative embodiment of an electronic device manufacturing process 700. Physical device information 702 is received at the manufacturing process 700, such as at a research computer 706. The physical device information 702 may include design information representing at least one physical property of a semiconductor device, such as the system 100 of FIG. 1, the system 200 of FIG. 2, the system 300 of FIG. 3, or any combination thereof. For example, the physical device information 702 may include physical parameters, material characteristics, and structure information that is entered via a user interface 704 coupled to the research computer 706. The research computer 706 includes a processor 708, such as one or more processing cores, coupled to a computer readable medium such as a memory 710. The memory 710 may store computer readable instructions that are executable to cause the processor 708 to transform the physical device information 702 to comply with a file format and to generate a library file 712.

In a particular embodiment, the library file 712 includes at least one data file including the transformed design information. For example, the library file 712 may include a library of semiconductor devices including a device that include the system 100 of FIG. 1, a device that includes the system 200 of FIG. 2, a device that includes the system 300 of FIG. 3, or any combination thereof, that is provided to use with an electronic design automation (EDA) tool 720.

The library file 712 may be used in conjunction with the EDA tool 720 at a design computer 714 including a processor 716, such as one or more processing cores, coupled to a memory 718. The EDA tool 720 may be stored as processor executable instructions at the memory 718 to enable a user of the design computer 714 to design a circuit including a device that include the system 100 of FIG. 1, a device that includes the system 200 of FIG. 2, a device that includes the system 300 of FIG. 3, or any combination thereof, of the library file 712.

The memory 718 may include software 719 that includes instructions that are executable by a computer (e.g., the design computer 714). For example, the software 719 may include instructions that are executable by the design computer 714 to receive timing information (e.g., the timing information 391 of FIG. 3) related to a design of a circuit after a layout phase of generating a design of a circuit. The software 719 may also include instructions that are executable by the computer to selectively identify at least one gate (e.g., the gate 352 of FIG. 3) of a combinational logic portion (e.g., the combinational logic portion 399 of FIG. 3) of the design of the circuit to be modified to respond to a test enable signal (e.g., the test enable signal (TE) 375). The at least one gate (e.g., the gate 352 of FIG. 3) is identified at least partially based on the timing information (e.g., the timing information 391 of FIG. 3). The software 719 may also include instructions that are executable by the computer to modify (e.g., the gate modification 380 of FIG. 3) the at least one gate (e.g., the gate 352 of FIG. 3). The at least one modified gate (e.g., the test isolation gate 376 of FIG. 3) is fixed at a constant level during a test mode and is dynamically changeable during a functional mode of operation of the circuit.

A user of the design computer 714 may enter circuit design information 722 via a user interface 724 coupled to the design computer 714. The circuit design information 722 may include design information representing at least one physical property of a semiconductor device, such as a device that include the system 100 of FIG. 1, a device that includes the system 200 of FIG. 2, a device that includes the system 300 of FIG. 3, or any combination thereof. To illustrate, the circuit design property may include identification of particular circuits and relationships to other elements in a circuit design, positioning information, feature size information, interconnection information, or other information representing a physical property of a semiconductor device.

The design computer 714 may be configured to transform the design information, including the circuit design information 722, to comply with a file format. To illustrate, the file formation may include a database binary file format representing planar geometric shapes, text labels, and other information about a circuit layout in a hierarchical format, such as a Graphic Data System (GDSII) file format. The design computer 714 may be configured to generate a data file including the transformed design information, such as a GDSII file 726 that includes information a device that include the system 100 of FIG. 1, a device that includes the system 200 of FIG. 2, a device that includes the system 300 of FIG. 3, or any combination thereof, in addition to other circuits or information. To illustrate, the data file may include information corresponding to a system-on-chip (SOC) that includes the circuit 102 of FIG. 1 and that also includes additional electronic circuits and components within the SOC.

The GDSII file 726 may be received at a fabrication process 728 to manufacture a device that include the system 100 of FIG. 1, a device that includes the system 200 of FIG. 2, a device that includes the system 300 of FIG. 3, or any combination thereof, according to transformed information in the GDSII file 726. For example, a device manufacture process may include providing the GDSII file 726 to a mask manufacturer 730 to create one or more masks, such as masks to be used with photolithography processing, illustrated as a representative mask 732. The mask 732 may be used during the fabrication process to generate one or more wafers 734, which may be tested and separated into dies, such as a representative die 736. The die 736 includes a circuit such as shown in the system 100 of FIG. 1, the system 200 of FIG. 2, the system 300 of FIG. 3, or any combination thereof.

The die 736 may be provided to a packaging process 738 where the die 736 is incorporated into a representative package 740. For example, the package 740 may include the single die 736 or multiple dies, such as a system-in-package (SiP) arrangement. The package 740 may be configured to conform to one or more standards or specifications, such as Joint Electron Device Engineering Council (JEDEC) standards.

Information regarding the package 740 may be distributed to various product designers, such as via a component library stored at a computer 746. The computer 746 may include a processor 748, such as one or more processing cores, coupled to a memory 750. A printed circuit board (PCB) tool may be stored as processor executable instructions at the memory 750 to process PCB design information 742 received from a user of the computer 746 via a user interface 744. The PCB design information 742 may include physical positioning information of a packaged semiconductor device on a circuit board, the packaged semiconductor device corresponding to the package 740 including a device that include the system 100 of FIG. 1, a device that includes the system 200 of FIG. 2, a device that includes the system 300 of FIG. 3, or any combination thereof.

The computer 746 may be configured to transform the PCB design information 742 to generate a data file, such as a GERBER file 752 with data that includes physical positioning information of a packaged semiconductor device on a circuit board, as well as layout of electrical connections such as traces and vias, where the packaged semiconductor device corresponds to the package 740 including a device that include the system 100 of FIG. 1, a device that includes the system 200 of FIG. 2, a device that includes the system 300 of FIG. 3, or any combination thereof. In other embodiments, the data file generated by the transformed PCB design information may have a format other than a GERBER format.

The GERBER file 752 may be received at a board assembly process 754 and used to create PCBs, such as a representative PCB 756, manufactured in accordance with the design information stored within the GERBER file 752. For example, the GERBER file 752 may be uploaded to one or more machines to perform various steps of a PCB production process. The PCB 756 may be populated with electronic components including the package 740 to form a representative printed circuit assembly (PCA) 758.

The PCA 758 may be received at a product manufacture process 760 and integrated into one or more electronic devices, such as a first representative electronic device 762 and a second representative electronic device 764. As an illustrative, non-limiting example, the first representative electronic device 762, the second representative electronic device 764, or both, may be selected from the group of a set top box, a music player, a video player, an entertainment unit, a navigation device, a communications device, a personal digital assistant (PDA), a fixed location data unit, and a computer, into which the at least one controllable energy consuming module is integrated. As another illustrative, non-limiting example, one or more of the electronic devices 762 and 764 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although FIG. 7 illustrates remote units according to teachings of the disclosure, the disclosure is not limited to these exemplary illustrated units. Embodiments of the disclosure may be suitably employed in any device which includes active integrated circuitry including memory and on-chip circuitry.

A device that include the system 100 of FIG. 1, a device that includes the system 200 of FIG. 2, a device that includes the system 300 of FIG. 3, or any combination thereof, may be fabricated, processed, and incorporated into an electronic device, as described in the illustrative process 700. One or more aspects of the embodiments disclosed with respect to FIGS. 1-5 may be included at various processing stages, such as within the library file 712, the GDSII file 726, and the GERBER file 752, as well as stored at the memory 710 of the research computer 706, the memory 718 of the design computer 714, the memory 750 of the computer 746, the memory of one or more other computers or processors (not shown) used at the various stages, such as at the board assembly process 754, and also incorporated into one or more other physical embodiments such as the mask 732, the die 736, the package 740, the PCA 758, other products such as prototype circuits or devices (not shown), or any combination thereof. Although various representative stages of production from a physical device design to a final product are depicted, in other embodiments fewer stages may be used or additional stages may be included. Similarly, the process 700 may be performed by a single entity or by one or more entities performing various stages of the process 700.

Those of skill would further appreciate that the various illustrative logical blocks, configurations, modules, circuits, and method steps described in connection with the embodiments disclosed herein may be implemented as electronic hardware, computer software executed by a processing unit, or combinations of both. Various illustrative components, blocks, configurations, modules, circuits, and steps have been described above generally in terms of their functionality. Whether such functionality is implemented as hardware or executable processing instructions depends on the particular application and design constraints imposed on the overall system. Skilled artisans may implement the described functionality in varying ways with each particular application, but such implementation decisions should not be interpreted as causing a departure from the scope of the present disclosure.

A software module may reside in random access memory (RAM), a magnetoresistive random access memory (MRAM), a spin-torque-transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method comprising:
after a layout phase of generating a design of a circuit and prior to completing the design of the circuit:
receiving, by a processor, timing information related to the design of the circuit;
identifying at least one gate of a combinational logic portion of the design of the circuit to be modified to respond to a test enable signal, the at least one gate identified at least partially based on the timing information; and
altering the design by modifying the at least one gate to be coupled to have an output that maintains a first logical level during a test mode of operation of the circuit and that is dynamically changeable during a functional mode of operation of the circuit.

2. The method of claim 1, wherein the at least one gate is selected to be modified based on a power dissipation, a logic path timing, and an area of the combinational logic portion.

3. The method of claim 1, further comprising:
determining a starting element of a logic path within the combinational logic portion;
traversing the logic path from the starting element to an ending element of the logic path to locate one or more gates along the logic path; and
applying selection criteria to the one or more located gates to selectively identify the at least one gate to be modified.

4. The method of claim 1, wherein the test mode corresponds to a scan test of at least one chain of sequential storage elements.

5. The method of claim 4, wherein the at least one chain of sequential storage elements comprises a scan chain of flip-flops.

6. The method of claim 1, wherein the at least one modified gate is configured to maintain the output at the first logical level while the test enable signal is asserted.

7. The method of claim 6, wherein the at least one modified gate is further configured to maintain the output at the first logical level in response to the test enable signal having a first value to maintain a state of logic elements that are responsive to the at least one modified gate along a logic path.

8. The method of claim 7, wherein the output is dynamically changeable between the first logical level and a second logical level during the functional mode of operation in response to the test enable signal having a second value.

9. The method of claim 1, wherein altering the design further comprises modifying the at least one gate by modifying an input of the at least one gate.

10. The method of claim 9, wherein modifying the input of the at least one gate comprises coupling the input of the at least one gate to receive the test enable signal.

11. The method of claim 1, wherein altering the design further comprises at least partially re-routing the combinational logic portion based on the at least one modified gate.

12. The method of claim 1, further comprising determining a depth level of the at least one gate and identifying the at least one gate based on the depth level.

13. The method of claim 1, further comprising verifying an operation of the combinational logic portion after modifying the at least one gate.

14. The method of claim 1, wherein identifying the at least one gate of the combinational logic portion of the design of the circuit comprises:
determining a set of elements of the combinational logic portion;
determining, for each particular element of the set of elements, one or more logic paths coupled to an output of the particular element; and
determining, for each particular element, whether an estimated delay associated with a modified operation of the particular element satisfies a timing margin for each of the one or more logic paths;
wherein the particular element is identified at least partially based on the modified operation satisfying the timing margin and at least partially based on a location of the particular element.

15. The method of claim 1, further comprising:
generating engineering change order (ECO) data corresponding to the at least one modified gate;
updating a layout of the circuit based on the ECO data; and
verifying a timing of operation of the combinational logic portion.

16. The method of claim 1, wherein the design of the circuit comprises a second combinational logic portion, and further comprising identifying a second gate of the second combinational logic portion of the design of the circuit to be modified to respond to the test enable signal.

17. The method of claim 1, wherein identifying the at least one gate is performed at the processor, and wherein the processor is integrated into an electronic device.

18. A method comprising:
a first step for receiving timing information related to a design of a circuit after a layout phase of generating the design of the circuit and prior to completing the design of the circuit;
a second step for identifying at least one gate of a combinational logic portion of the design of the circuit to be modified to respond to a test enable signal, the at least one gate identified at least partially based on the timing information; and
a third step for altering the design by modifying the at least one gate to be coupled to have an output that maintains a first logical level during a test mode of operation of the circuit and that is dynamically changeable during a functional mode of operation of the circuit,
wherein the first step, the second step, and the third step are performed by a processor integrated into an electronic device.

19. A computer readable non-transitory medium storing instructions executable by a computer, the instructions comprising:
instructions that are executable by the computer to receive timing information related to a design of a circuit after a layout phase of generating the design of the circuit and prior to completing the design of the circuit;
instructions that are executable by the computer to identify at least one gate of a combinational logic portion of the design of the circuit to be modified to respond to a test enable signal, the at least one gate identified at least partially based on the timing information; and
instructions that are executable by the computer to alter the design by modifying the at least one gate to be coupled to have an output that maintains a first logical level during a test mode of operation of the circuit and that is dynamically changeable during a functional mode of operation of the circuit.

20. The computer readable non-transitory medium of claim 19, wherein the instructions are executable by a processor integrated in a device selected from a group consisting of a set top box, a music player, a video player, an entertainment unit, a navigation device, a communication device, a personal digital assistant (PDA), and a fixed location data unit.

21. An apparatus comprising:
   means for receiving timing information related to a design of a circuit after a layout phase of generating the design of the circuit and prior to completing the design of the circuit;
   means for identifying at least one gate of a combinational logic portion of the design of the circuit to be modified to respond to a test enable signal, the at least one gate identified at least partially based on the timing information; and
   means for altering the design by modifying the at least one gate to be coupled to have an output that maintains a first logical level during a test mode of operation of the circuit and that is dynamically changeable during a functional mode of operation of the circuit.

* * * * *